Dec. 27, 1938.   J. W. OWENS   2,141,278
SWITCH MECHANISM
Filed April 6, 1937
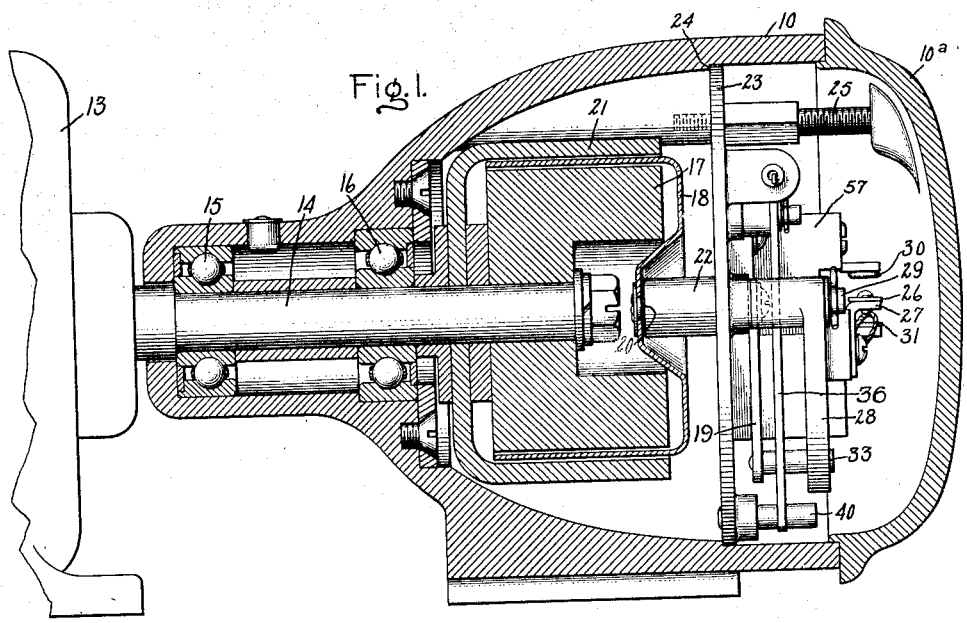
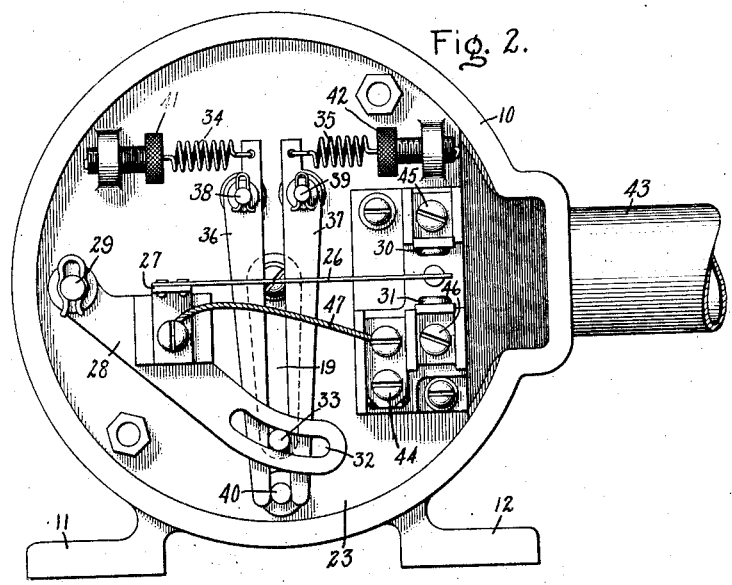
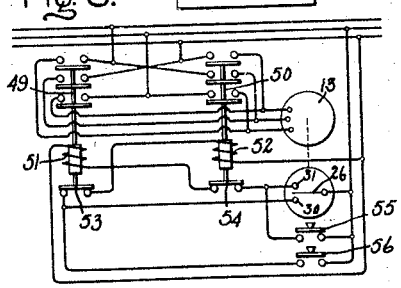
Inventor:
Joseph W. Owens,
by Harry E. Dunham
His Attorney.

Patented Dec. 27, 1938

2,141,278

UNITED STATES PATENT OFFICE 2,141,278

SWITCH MECHANISM

Joseph W. Owens, Schenectady, N. Y., assignor to General Electric Company, a corporation of New York Application April 6, 1937, Serial No. 135,232

7 Claims. (Cl. 200—52)

My invention relates to switch mechanism more particularly to direction responsive switch mechanism, and has for its object a simple and reliable direction responsive switch for use especially in the control of electric motors.

In the plugging control of electric motors, i. e., the reversal of the motor connections while the motor is running to bring the motor quickly to rest, switching mechanism is provided for disconnecting the motor from the supply source when it comes to rest so as to prevent the reversal of the motor and operation in the opposite direction. This mechanism consists of a member which is continuously driven by the motor and connected to actuate a contact device from one position to another in response to the direction of rotation of the motor.

In carrying out my invention I provide a contact arm which is actuated through a pin and slot connection by a member connected through an electromagnetic driving connection with the motor shaft.

For a more complete understanding of my invention reference should be had to the accompanying drawing Fig. 1 of which is a view mainly in vertical section of a switch mechanism embodying my invention, Fig. 2 is an elevation view showing the contact mechanism with the cover of the device removed, while Fig. 3 is a simplified diagram of typical connections for the switching mechanism when used with a motor.

Referring to the drawing, I have shown my invention in one form as applied to an electric motor for controlling the plugging operation of the motor. The mechanism is shown enclosed in a suitable metallic casing 10 provided with a cover 10a and with suitable supporting feet 11 and 12 arranged to be secured to the support for the driving motor 13. The device is operated by a shaft 14 which is secured to one end of the motor shaft, or the shaft 14 may be an extension of the motor shaft or suitably connected thereto as by a V-belt. It is provided with suitable ball bearings 15 and 16 in the casing 10.

On its inner end the shaft 14 carries electromagnetic driving means consisting of a cylindrical permanent magnet 17 made of a suitable permanent magnet material preferably a composition of aluminium, nickel, cobalt and iron such as described and claimed in Patent No. 1,968,569, issued July 31, 1934, to William E. Ruder. The magnet member 17 is energized with permanent north and south poles diametrically opposite to each other with respect to the axis of rotation of the shaft 14 and, as shown in the drawing, the magnet is secured to the shaft 14 with its axis coincident with the axis of rotation of the shaft. The pole faces on the outside of the cylindrical magnet 17 are therefore parallel with the axis of rotation of the shaft 14. Closely surrounding the magnet 17 is a cylindrical or cup-shaped armature member 18 made of electrically conducting material, such as aluminum. Thus as the magnet 17 is rotated by the motor a magnetic force is applied to the armature 18 by reason of the currents induced in it by the rotating magnetic field whereby the armature member 18 is turned in the same direction as the shaft to actuate a crank arm 19 connected to the shaft 20 on which the armature member is secured, the crank arm 19 being in turn connected to actuate switching mechanism.

Thus it will observed that the cooperating magnet 17 and armature 18 form a yieldable or slip driving connection between the shaft 14 and the shaft 20, the driving torque of this connection being definitely limited and permitting unlimited rotation of the shaft 14 in either direction. For the purpose of providing a return path for the flux of the magnet 17 a hollow cylindrical cup-shaped member 21 made of magnetic material, such as drawn steel, is provided on the shaft 14, this member being somewhat larger in diameter than the armature member 18 and surrounding it in concentric relation therewith. As shown, a relatively small air gap is provided between the armature 18 and the magnet 17 and also between the armature 18 and the core member 21. Because of the fact that the member 21 rotates with the magnet 17, there is no heating or energy loss due to eddy currents or hysteresis in this return magnetic circuit.

The shaft 20, as shown, is preferably mounted in a bearing 22 secured in the center of a supporting plate 23, the casing 10 being countersunk to provide a shoulder 24 against which the plate 23 is secured by suitable screws. As shown, the wall of the casing 10 is made somewhat thicker at diametrically opposite points to receive two screws 25, only one of which is shown.

The switching mechanism is mounted on the outer face of the supporting plate 23. It comprises a flexible contact arm 26 secured at one end to a support 27 on an intermediate point of an actuating arm 28 having one end mounted on a pivot pin 29 secured to the support 23. The other end of the contact arm 26 is provided with suitable contact making and breaking surfaces on each side and moves between spaced fixed contacts 30 and 31 secured to the plate 23 in electrically insulated relation therewith. In order that it may be operated by the actuating arm 19, the movable end of the arm 28 is provided with an arcuate slot 32 in which moves a pin 33 secured to the end of the arm 19. This slot 32 is arranged at such an angle with the arcuate path of movement of the pin 33 that movement of the pin in either direction from its central position, shown in the drawing, to the end of the slot effects sufficient movement of the arm 28 about its pivot 29 to move the contact arm 26 into engagement with one or the other of its stationary contacts.

Stops for the pin 33 are provided by the walls of the slot 32 at the ends of the slot whereby the movement of the pin 33 is limited in each direction. Furthermore, the arrangement of the pin and slot with respect to the pivot 29 is such that while a positive connection is provided between the arm 19 and the contact arm by the engagement of the pin with the sides of the slot but little force is applied to actuate the contact arm when the pin is brought to rest at either end of the slot. This is due to the fact that the pin 33 is then one of three fixed points of a mechanical triangle, the other two points being the pivot 29 and the shaft 22.

The contact arm 26 is biased to an intermediate position midway between the contacts 30 and 31 by means of helical tension springs 34 and 35 which are connected to the upper ends of arms 36 and 37 mounted on pivots 38 and 39 secured to the plate 23. The arms 36 and 37 are biased by the springs in opposite directions into engagement, as shown, with opposite sides of a pin 40 secured to the plate 23, this pin having preferably the same diameter as the pin 33. In this position also the adjacent edges of the arms are substantially parallel with each other and the pin 33 is held between them, as shown, in a definite angular position and substantially in the middle of the slot 32 whereby the contact arm is held in the intermediate position shown. Thus movement of the pin 33 moves one or the other of the arms by reason of whch it is biased back to the position shown. The outer ends of the springs 34 and 35 are secured to adjustable screws 41 and 42.

Provision is made for electric connections with the switch contacts by an outwardly extending projection in the wall of the casing 10 opposite the contacts to which a conduit 43 may be secured and through which insulated electrical conductors may be led to the binding posts 44, 45 and 46 for the movable contact arm 26 and the stationary contacts 30 and 31 respectively. The binding post 44 is electrically connected with the movable contact 26 through a flexible connection 47 leading to the support 27 for the switch arm, this support being electrically insulated by the actuating arm 28.

In Fig. 3 simplified typical connections are shown for the switching mechanism in the control of the motor 13 shown as a three-phase alternating current motor. In the circuit of the motor are suitable reversing switches 49 and 50 actuated by coils 51 and 52 which, when energized, open interlock switches 53 and 54 in circuit with each other. For operation in one direction, a suitable motor switch 55, shown as a push button, is closed whereby the coil 51 is energized. The motor starts and for that particular direction of rotation the movable contact arm 26 is moved into engagement with the contact 30. When it is now desired to plug the motor to rest the switch 55 is opened whereupon the coil 51 is deenergized, the switch 49 opened and the interlock switch 53 closed. This closing of the switch 53 establishes a circuit for the coil 52 through the contacts 26 and 30 whereby the switch 50 is closed. This plugs the motor to rest and when the motor comes to rest the switch arm 26 is immediately moved to its intermediate open position in accordance with its bias whereby the coil 52 is deenergized and the motor disconnected from the supply source.

For rotation in the opposite direction the push button 56 is used and, when the motor is to be stopped a circuit is established through the contact arm 26 to connect the motor to the supply source for opposite rotation whereby the motor is plugged to rest as will be understood from the preceding description.

Preferably the arm 28 is made of a suitable electrical insulating material such as fibre or preferably from a synthetic resin with a suitable filler. Also as shown the binding posts 44, 45 and 46 are mounted in a block 57 of electrically insulating material whereby they are electrically insulated from each other and from the supporting plate 23.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A direction switch mechanism comprising a shaft mounted for continuous rotation in either direction, a second shaft mounted in axial alignment with said first shaft, a yieldable driving connection between said shafts, a crank arm secured to said second shaft, a pivoted contact arm, and a pin and slot operating connection between said contact arm and said crank arm, said connection being arranged to form a stop for said crank arm for each direction of rotation and to limit the actuating force applied to said contact arm after a predetermined movement of said contact arm.

2. A direction switch mechanism comprising a shaft mounted for continuous rotation in either direction, a second shaft mounted in axial alignment with said first shaft, a yieldable driving connection between said shafts, a crank arm secured to said second shaft, a contact arm, a pivoted supporting arm for said contact arm, and a pin and slot operating connection between said supporting arm and said crank arm, said connection being arranged to form a stop for said crank arm for each direction of rotation and to limit the actuating force applied to said contact arm after a predetermined movement of said contact arm.

3. A direction switch mechanism comprising a shaft mounted for continuous rotation in either direction, a second shaft mounted in axial alignment with said first shaft, a yieldable driving connection between said shafts, a crank arm secured to said second shaft, a contact arm, a pivoted supporting arm for said contact arm, a pin and slot operating connection between said supporting arm and said crank arm, said connection being arranged to form a stop for said crank arm for each direction of rotation and to limit the actuating force applied to said contact arm after a predetermined movement of said contact arm, and means for biasing said crank arm to a position in which said pin is substantially in the middle of said slot.

4. A direction switch mechanism comprising a pair of shafts mounted in axial alignment with each other, a cylindrical permanent magnet mounted on a first of said shafts, said magnet having a pair of pole faces parallel with said shafts, a cylindrical armature member surrounding said magnet and mounted on the second of said shafts, a cylindrical field member of magnet material on the outside of said armature member secured to said first shaft providing a return path for magnetic flux from said pole faces, to said first shaft, whereby rotation of one of said shafts produces an electromagnetic torque tending to rotate the other of said shafts, a crank arm secured to the other of said shafts, a pivoted contact arm, and a pin and slot operating connection between said contact arm and said crank arm, said connection being arranged to form a stop for said crank arm for each direction of rotation and to limit the actuating force applied to said contact arm after a predetermined movement of said contact arm.

5. A direction switch mechanism comprising a pair of shafts mounted in axial alignment with each other, a cylindrical permanent magnet mounted on a first of said shafts, said magnet having a pair of pole faces parallel with said shafts, a hollow cylindrical armature member surrounding said magnet and mounted on the second of said shafts, a hollow cylindrical field member of magnet material on the outside of said armature member secured to said first shaft providing a return path for magnetic flux from said pole faces to said shaft whereby rotation of one of said shafts produces an electromagnetic torque tending to rotate the other of said shafts, a crank arm secured to the other of said shafts, a contact arm, a pivoted supporting arm for said contact arm, and a pin and slot operating connection between said supporting arm and said crank arm, said connection being arranged to form a stop for said crank arm for each direction of rotation and to limit the actuating force applied to said contact arm after a predetermined movement of said contact arm.

6. A direction switch mechanism comprising a shaft mounted for continuous rotation in either direction, a second shaft mounted in axial alignment with said first shaft, a cylindrical permanent magnet mounted on said first shaft, said magnet having a pair of pole faces parallel to said shaft and diametrically opposite each other, a hollow cylindrical armature member surrounding said magnet mounted on said second shaft, a hollow cylindrical field member of magnet material on the outside of said armature member secured to said first shaft and providing a path for magnetic flux from said pole faces to said first shaft, whereby rotation of said magnet by said first shaft produces an electromagnetic torque on said armature member, a crank arm secured to said second shaft, a contact arm, a pivoted supporting arm for said contact arm, and a pin and slot operating connection between said supporting arm and said crank arm, said connection being arranged to form a stop for said crank arm for each direction of rotation and to limit the actuating force applied to said contact arm after a predetermined movement of said contact arm.

7. A direction switch mechanism comprising a shaft, a yieldable driving connection for said shaft, a crank arm secured to said shaft, a laterally extending pin on the end of said crank arm, a contact, a supporting arm for said contact provided with a pivot parallel with the axis of said shaft, said supporting arm being provided with a slot in which said pin moves upon rotation of said shaft, means for biasing said crank arm to a position in which said pin is substantially in the middle of said slot, said slot being of such length that its end walls form stops for said pin for each direction of rotation of said shaft.

JOSEPH W. OWENS.